Patented July 4, 1933

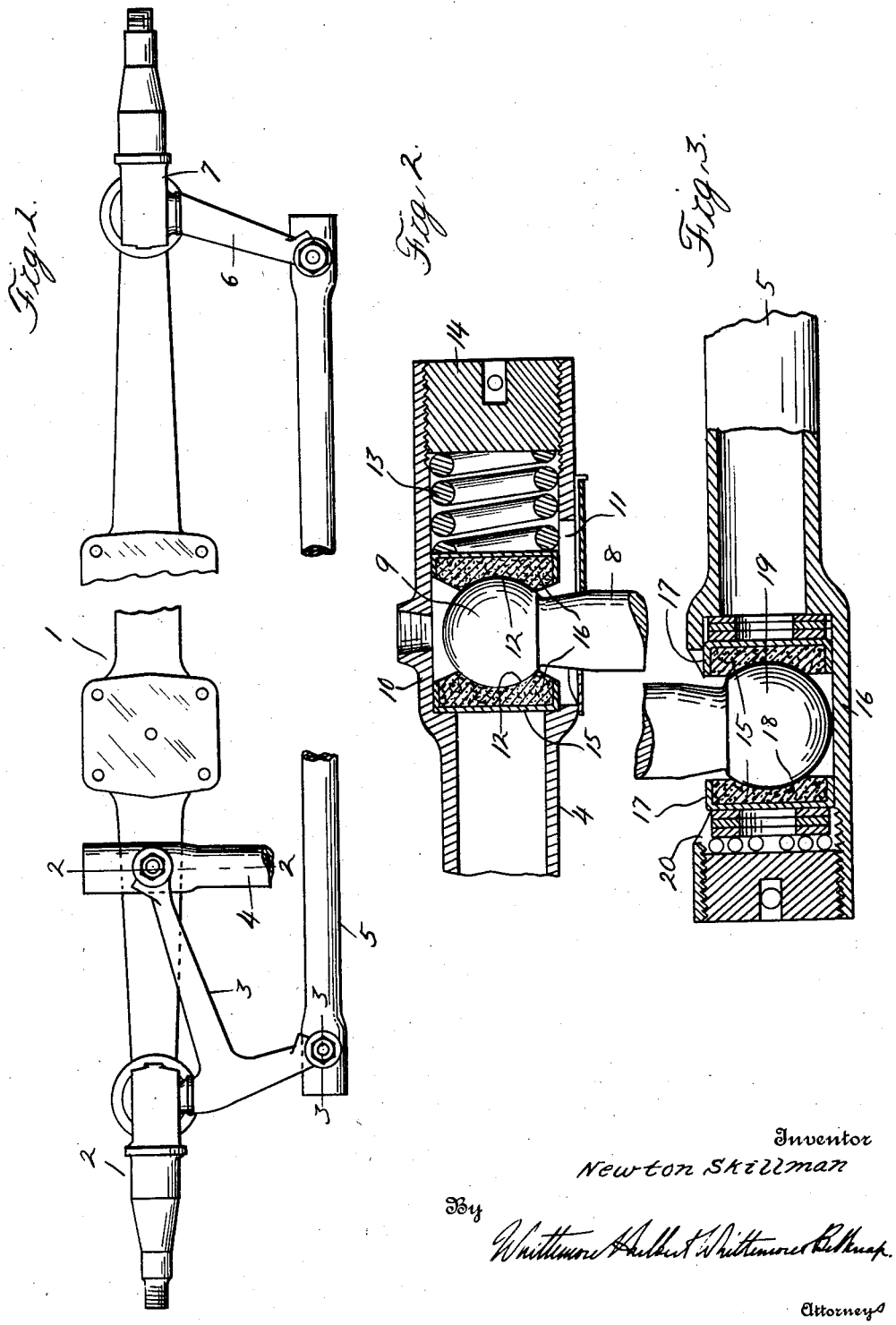

1,916,744

UNITED STATES PATENT OFFICE

NEWTON SKILLMAN, OF HIGHLAND PARK, MICHIGAN, ASSIGNOR TO O. & S. BEARING CO., OF DETROIT, MICHIGAN, A CORPORATION OF MICHIGAN

BALL AND SOCKET CONNECTION

Application filed January 3, 1927. Serial No. 158,775.

The invention relates to ball and socket connections and is particularly applicable for use in motor vehicles. One of the objects of the invention is to provide a self-lubricating ball and socket connection thereby avoiding the necessity of lubricating the same at successive intervals. Another object is to provide lubricant impregnated bearings between the ball and socket members, which bearings will withstand the stresses to which they are subjected. Further objects of the invention reside in the novel features of construction and combinations and arrangements of parts as more fully hereinafter set forth.

In the drawing:—

Figure 1 is a plan view of the front axle assembly of a motor vehicle embodying my invention;

Figures 2 and 3 are cross sections on the lines 2—2 and 3—3 of Figure 1.

My invention is designed particularly for use in motor vehicles in which 1 is the front axle, 2 are the steering spindles at the ends of the front axle, and 3 is the steering knuckle rigidly secured to one of the steering spindles. The inwardly extending arm of this steering knuckle is connected by a ball and socket connection to the drag link 4 which extends rearwardly and is suitably secured to the steering wheel of the motor vehicle. The rearwardly extending arm of the steering knuckle is secured by a ball and socket connection to the tie rod 5 which extends across substantially parallel with the front axle and is secured by a ball and socket connection to the rearwardly extending arm 6 which is in turn rigidly secured to the steering spindle 7 at the opposite end of the front axle.

For the purpose of providing ball and socket connections which do not require lubricating at successive intervals, I have made these ball and socket connections self-lubricating. As shown particularly in Figure 2, 8 is a pin extending transversely of and secured to the inwardly extending arm of the steering knuckle 3 and having the ball 9 at its free end. This ball is located within the socket 10 formed upon the drag link and is insertable through the opening 11 in the wall of the socket. 12 are cooperating self lubricating pads located in the socket 10 at opposite sides of the ball 9 and so arranged that they will not interfere with the movement of the ball relative to the socket. One of the pads 12 is seated against one end of the socket while the other pad is yieldably forced against the first-mentioned pad by means of the coil spring 13 which is also located within the socket and held in place by the plug 14 threadedly engaging the socket. Each pad 12 is formed of the cup-shaped container 15 which is preferably formed of stamped sheet metal and the bearing 16 located in the cup-shaped container. The bearing is preferably formed of shredded asbestos, graphite and a suitable binder, such as calomel or collodion and is highly compressed. This bearing may be formed by pressing or molding the same and has a concave face for fitting and engaging the ball 9. Also for the purpose of providing clearance to allow the necessary relative movement of the ball and socket, the portion of the bearing leading from the concave face to its periphery is tapered. With this arrangement it is possible to provide a relatively small self-lubricating bearing for the ball and socket connection which is sufficiently strong to withstand stresses to which it is subjected, inasmuch as the bearings may be made relatively thin and highly compressed since they are reinforced and held from breaking by the cup-shaped containers within which they are located. Furthermore, the bearings are preferably permanently located in these cup-shaped containers as by being formed therein or by being pressed thereinto after being formed so that the cup-shaped containers can function more efficiently in preventing breakage of the bearings. The material forming the bearings 12 might be reinforced as by means of brass wire extending through the shredded asbestos, graphite and binder.

As shown particularly in Figure 3, the ball and socket connections between the rearwardly extending arm of the steering knuckles and the tie rod 5 are made up in much the same manner as shown particularly in Figure 2. 15 are the self-lubricating pads which are arranged within the socket 16 formed at either end of the tie rod. These pads each comprise the cup-shaped container 17 and the bearing 18 which is located within the cup-shaped container and preferably permanent therewith. These bearings have concave faces for engaging opposite sides of the ball 19 which is insertable through the opening 20 in the wall of the socket. The material forming these bearings may be the same as that previously referred to or it may comprise woven asbestos, woven brass wire, graphite and a suitable binder such as calomel or collodion, the whole being highly compressed. Instead of this material the bearing might comprise woven copper wire with woven linen around the wires, graphite and a suitable binder such as vulcanite. In any of these cases, the material is very hard and has self lubricating properties so that it will properly function to form a self-lubricating bearing which is sufficiently strong to withstand the stresses to which it is subjected inasmuch as the bearing is contained within a cup-shaped container.

What I claim as my invention is:

1. A bearing member for a ball and socket connection consisting of a container within which is positioned a mass of highly compressed bonded fibrous material impregnated with a solid lubricant, said container confining and supporting said mass on substantially all sides except the bearing surface.

2. A bearing member for a ball and socket connection consisting of a container within which is positioned a mass of highly compressed bonded fibrous material impregnated with a solid lubricant having a bearing surface which is concave, said container confining and supporting said mass on substantially all sides except the bearing surface.

3. A bearing member for a ball and socket connection consisting of a cylindrical sheet metal container within which is positioned a mass of highly compressed bonded fibrous material impregnated with a solid lubricant having a bearing surface which is concave, said container confining and supporting said mass on substantially all sides except the bearing surface.

In testimony whereof I affix my signature.

NEWTON SKILLMAN.